United States Patent [19]
Hopkins

[11] 3,923,414
[45] Dec. 2, 1975

[54] VIBRATION DAMPING SUPPORT
[75] Inventor: David Alan Hopkins, Detroit, Mich.
[73] Assignee: The Valeron Corporation, Detroit, Mich.
[22] Filed: July 16, 1973
[21] Appl. No.: 379,438

[52] U.S. Cl............... 408/143; 82/DIG. 9; 188/1 B; 279/83
[51] Int. Cl.² .......................................... B23B 47/00
[58] Field of Search........ 408/143; 188/1 B; 279/83; 82/DIG. 9

[56] References Cited
UNITED STATES PATENTS

| | | | |
|---|---|---|---|
| 2,699,696 | 1/1955 | Hahn | 408/143 |
| 2,816,769 | 12/1957 | Noble | 279/83 |
| 2,826,094 | 3/1958 | Johnson | 74/572 |
| 3,022,084 | 2/1962 | Dresback | 279/83 |
| 3,207,009 | 9/1965 | Carlstedt | 408/143 |
| 3,559,512 | 2/1971 | Aggarwal | 408/143 |

Primary Examiner—Frank T. Yost
Assistant Examiner—Z. R. Bilinsky
Attorney, Agent, or Firm—Farley, Forster and Farley

[57] ABSTRACT

A vibration damping support suitable for a boring bar comprising a shank member, multiple parallel bores extending axially of said boring bar in one end of the shank member and high inertia mass members positioned in each axial bore with a slight circumferential clearance, the mass members being free to move transversely to the shank axis within the circumferential clearance provided. The shank may include a separable extension member or tool nose piece and a connecting member with interengaging retention means for drawing the shank and extension into rigid engagement.

17 Claims, 8 Drawing Figures

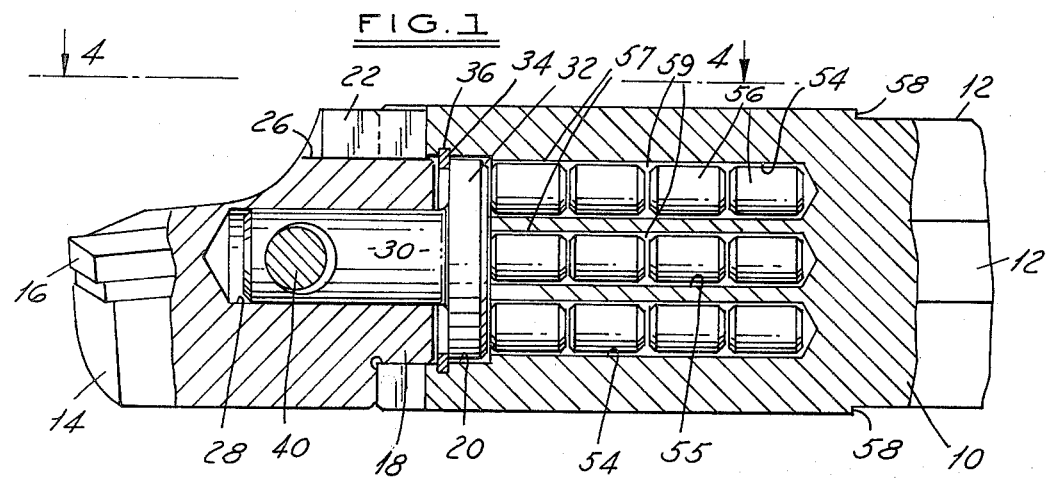
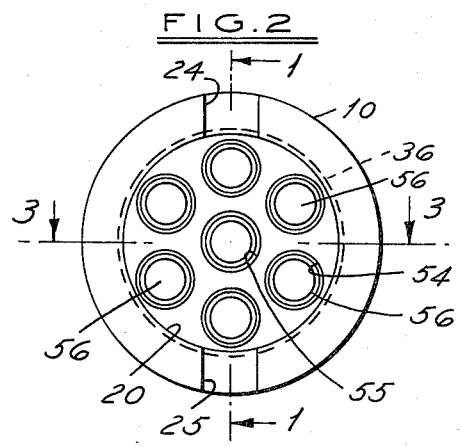
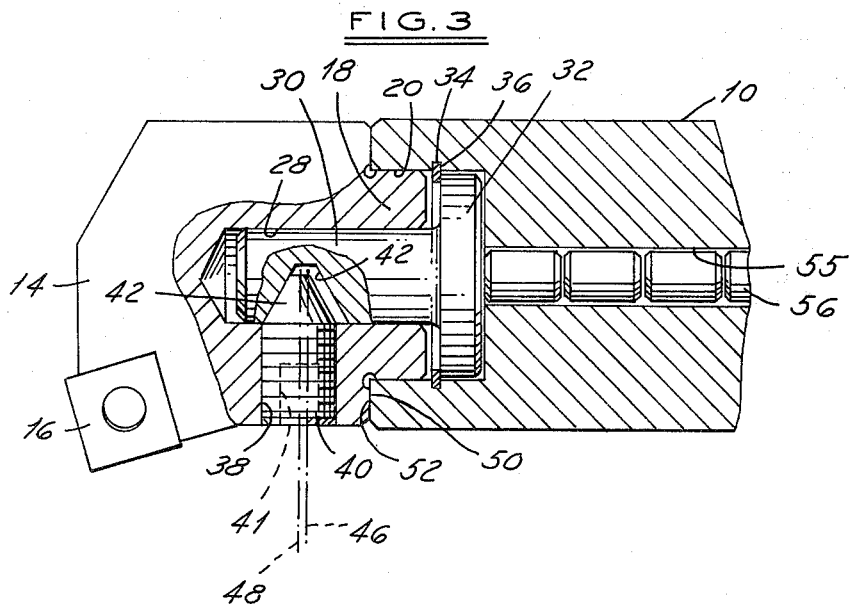

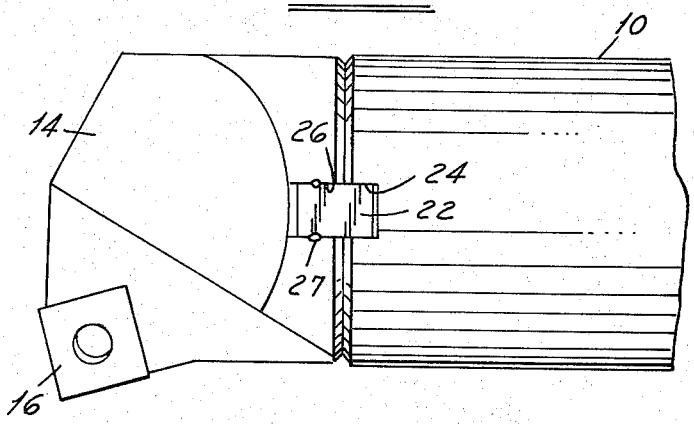
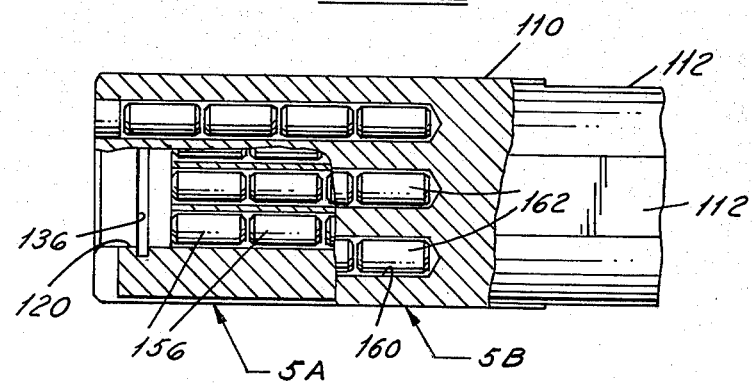
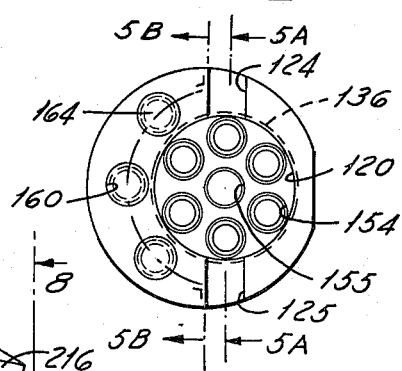
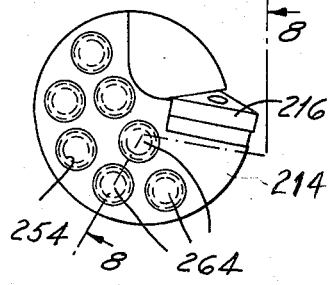
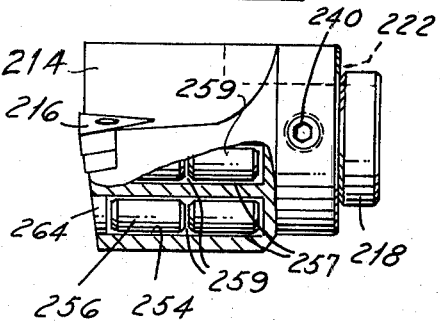

VIBRATION DAMPING SUPPORT

BACKGROUND OF THE INVENTION

This invention relates to means for reducing or eliminating induced vibration in tooling or tool supports, especially boring bars. Under certain machining conditions vibration is induced into cutting tools and their supports with resulting poor surface finish or tool breakage. Such vibrations are particularly noticeable in boring operations where the boring bar has a large overhang (distance from tool point to point where bar is supported). A number of different modifications to boring bars have been disclosed in an attempt to control or eliminate induced vibrations. Examples of bars constructed to reduce vibration are shown in the following U.S. Pat. Nos. 3,601,229, 3,598,498, 3,447,402, 3,207,009, 3,164,041, 3,064,503, 2,699,696, 2,656,742, 2,591,115 and 2,051,954.

For various reasons the prior art devices have not been entirely satisfactory. Devices which require a bore extending the full length of the bar are less rigid than solid bars resulting in increased vibrational amplitude which must be overcome by the damping device. Devices incorporating elastomer elements and springs are subject to changes in reactive characteristics during the life of the elements under working conditions. The elements often must be replaced at regular intervals and the character of the bar is uncertain from one usage to the next. Many devices include inertia members extending a significant distance into the bar. Research has shown that the inertia members should be located as close to the tool point as possible for greater effectiveness. Numerous prior art devices disclose a large central axial bore containing the inertia members which sacrifice bar rigidity at the end of the bar closest to the cutting point where rigid attachment is required for the extension member.

Prior art devices disclose a variety of means for attaching nose pieces to a boring bar; but seldom with means for exchanging nose pieces of varying sizes and geometries. Where multiple screws are used around the periphery of the nose for attachment to the bar, the noses cannot be changed rapidly. Where a separate piece is added between the end of the bar and the nose piece to facilitate attachment, the tool point is undesirably extended further from the reactive mass member.

SUMMARY OF THE INVENTION

Applicant's invention comprises a plurality of reactive high inertia mass members located in a plurality of bore holes adjacent the free end of the support. The bore holes are sized relative to the mass members to provide circumferential and axial clearance for each mass member just sufficient for substantially friction free individual movement without excessive or unnecessary lost motion. Interengaging retention and piloting means are provided for a separable extension member to minimize the distance of the mass members from the support end without sacrifice of rigidity.

The present invention places the reactive mass as close as possible to the cutting point and does not substantially sacrifice rigidity relative to an entirely solid bar. The extension member construction allows quick release to exchange nose pieces. The construction does not depend upon elastomer of spring devices which may change character over time and therefore is very predictable in operation. The character of the bar may be changed for different machining operations by simply exchanging reactive members with different clearance or density as hereafter explained.

Applicant has found that reactive members of identical diameter in a bore are preferable to the varying diameters in the prior art because excessive travel for all the reactive members can be minimized.

DESCRIPTION OF THE DRAWINGS

FIG. 1 is a cutaway side view of the support with a boring head attached;

FIG. 2 is an end view of the support with the boring head removed;

FIG. 3 is a cutaway top view of FIG. 1;

FIG. 4 is a top view of FIG. 1;

FIG. 5 is a cutaway side view of an alternate form of the support of FIG. 1;

FIG. 6 is an end view of FIG. 5;

FIG. 7 is an end view of an alternate form of boring head; and

FIG. 8 is a cutaway side view of the boring head of FIG. 7.

DESCRIPTION OF THE PREFERRED EMBODIMENT

In FIGS. 1 and 2, the support includes a shank member 10 generally circular in cross section and having one or more flats 12 formed in the outer surface suitable for retaining the support in a machine fixture (not shown) in one or more circumferential positions. A boring bar nose 14 is shown attached to one end of the support 10 and includes a typical cutting insert 16 attached thereto. The nose includes a cylindrical pilot 18 fitted accurately into a cylindrical bore 20 in the support 10 to provide an accurate radial position for the nose 14. A boring nose drive key 22 is fitted into drive key slots 24 and 26 in the support 10 and nose 14 respectively as is shown in FIG. 4 in addition to FIG. 1. An alternate drive key slot 25 is formed in the support 10 to allow use of right or left handed nose pieces on the support. The key 22 is staked at 27 to prevent loss when the nose is removed from the support.

An internal bore 28 in the nose 14 communicates with the bore 20 in the shank member 10 as shown in FIG. 1. Inserted in bore 28 is a connecting member 30 which extends into bore 20. The connecting member 30 includes a relatively large head 32 which engages a retaining ring 34 in turn fitted into a circumferential slot 36 best shown in FIGS. 1 and 3. The nose 14 includes a threaded bore 38 with a cone point screw 40 inserted therein. The cone point screw 40 includes a socket 41 for a "hex" wrench or other similar tool. The cone point 42 of the screw 40 engages a conical depression 44 in the connecting member 30 and having an axis 46 offset from the axis 48 of the cone point screw 40 in a direction parallel to and towards the shank member 10. Thus, tightening of the screw 40 into the conical depression 44 draws the connecting member 30 against the retaining ring 34 and thereby draws the end faces 50 and 52 of the shank member 10 and nose 14 respectively into tight rigid engagement to provide a rigid and accurate boring bar.

The end of the support nearest the nose 14 includes a plurality of bore holes 54 extending from the larger bore 20 in an axial direction. Each of the bores 54 includes a plurality of cylindrical slugs or mass members 56 on the order of a few thousands of an inch smaller in diameter than the bore 54. The clearance about the slugs 56 is shown exaggerated at 57. The slugs 56 are preferably identical within manufacturing tolerance. It is important that the slugs 56 be as free as possible to move independently of each other within the circumferential clearance 57. Therefore, a clearance 59 at the ends of each slug and at either end of each bore is provided to minimize any frictional interengagement. The induced vibrations or chatter are generally within audible range and can extend in frequency above the audible range. Therefore, the slugs must be capable of reacting within the bores at frequencies of the same order of magnitude. Viscous drag on the slugs 56 is minimized by utilizing air to fill the clearances 57 and 59 and the bores 54 may be evacuated to reduce the viscous drag to an even greater extent. Where machining takes place with a coolant, other liquid, or fine particle environment, scaling means (not shown) should be included to prevent liquid or particles from entering in the bores 54 which might inhibit free movement of the slugs.

The slugs 56 are preferably formed from a material having a substantially greater density than the material of the shank member 10 and this is particularly the case where heavy cuts are made. Suitable materials are steel for the shank member 10 and sintered tungsten carbide for the slugs 56. The steel and tungsten carbide combination provides hard surfaces for the bores 54 and slugs 56 thereby minimizing wear of the surfaces and deformations which may occur with softer materials such as lead. Such hard surfaces allow the applicant's configuration to be more effective in reducing the relatively high frequency induced vibrations. For light cuts steel of the same density as the shank has been successfully employed. "Mallory" is another suitable high density alternative material having high strength and less brittleness than sintered tungsten carbide. Preferably the bores 54 and slugs 56 are concentrated as near to the nose 14 and cutting insert 16 as possible to be more effective in reacting against the induced vibration. The remaining portion of the shank member 10 is solid which thereby provides the greatest rigidity possible for a given diameter and material. Additionally, the user can shorten the support as desired merely by cutting off a portion at any location up to the end 58 of those flats 12 which are in line with the key slots 24 best shown in FIG. 1. In the preferred embodiment the portion of the shank member 10 which includes the bores 54 is less than 25 percent of the entire length of the support. The superior rigidity of applicant's bar configuration allows the use of a softer attendant with attenant lower natural frequency. Such lower frequency is in turn more effectively controlled.

The reactive or damping characteristics of the bar may be adjusted by removing the nose 14 and retaining ring 34 to allow removal of the connecting member 30. The slugs 56 may be then removed from the bores 54 and an alternate set of slugs having either a different density or different circumferential clearance 57 may be inserted to change the reactance of the support.

Slugs 56 with a diameter 0.002 inch less than the bores 54 have been found suitable for finish boring and slugs 56 with a diameter 0.005 inch less than the bores 54 have been found suitable for rough boring with the same bar. End clearances of 0.002 inch are suitable for either boring condition.

As shown in FIG. 2, six bores 54 are spaced radially about a central seventh bore 55. The slugs 56 located in the bore 55 provide a mass reactive against transverse vibration in any axial plane. The slugs located in the radially spaced bores in addition to providing masses reactive against transverse vibration additionally are reactive against torsional vibration. The plurality of small bores 54 provides a web of remaining material in the shank member 10 thereby minimizing the effect of the bores on the strength and rigidity of the shank member 10.

In FIGS. 5 and 6, an alternate form of the support is shown. This alternate support is adapted to utilize the same nose 14 as above; however, the shank member 110 is of larger diameter than above and can be used to provide greater stiffness where a larger diameter boring bar can be accommodated. To accommodate the relatively smaller nose above, the axis of the connecting bore 120 is spaced about the axis of the shank member 110 as shown in FIG. 6. The diameter of the bore 120 and the retaining ring slot 136 are identical to bore 20 and slot 36 to accommodate the nose 14. Keyways 124 are provided as above in proper alignment with a diametral plane through the center of the bore 120 to accommmodate the alignment of the keyway 26 of the nose 14. Bore holes 154 and 155 communicating with the bore 120 and thereby allowing retention of slugs 156 in a manner similar to that above are located symmetrically about the axis of the bore 120. However, in the added volume of metal in the shank member 110 to one side of the bore 120, additional bore holes 160 and slugs 162 may be accommodated to increase the reaction mass of the support. Such a configuration provides substantially greater reactive mass against transverse and torsional induced vibration. The slugs 162 are retained in the support by short press fit retaining plugs 164 as shown in FIG. 6. The alternate configuration allows the same boring nose to be utilized on a variety of diameters and stiffnesses of supports.

FIGS. 7 and 8 disclose an extension member or nose 214 adapted to include bores 254 and slugs 256. The slugs 256 are retained in the bores 254 by press fit slugs 264 with circumferential 257 and end 259 clearance provided as above. The nose 214 includes a cylindrical pilot 218, key 222 and cone point screw 240 for interchangeable attachment to the supports described above or alternatively may be attached to a solid undamped support to provide a damped boring bar.

The following tests were performed with boring bars constructed in accordance with the disclosure above. A test bar 1¼ inch in dia. by 14 inches in length and containing 28 carbide slugs 0.249 inch in dia. by 0.500 inch in length was tested under various conditions. All tests were conducted with either TNM 322 or SNM 422 cutting inserts modified with a chip control groove giving a positive rake at the cutting edge on 4142 SMT 24/26 Rc material. Boring cuts were taken with 0.040 to 0.090 inch depth of cut. With an overhang ratio of 7:1 tests were run at 300 surface feet per minute and 400 surface feet per minute and the feed per revolution set at 0.010, 0.008 and 0.006 inch. A slug clearance of 0.002/0.003 inch effectively nullified the chatter and the surface finish was extremely fine with no visible indication of chatter. A freer machining steel would reduce any tendency to chatter still further.

In tests run for heavy cuts of 0.090 to 0.190 inch depth of cut the test material again was 4142 SMT 24/26 Rc and the cutting inserts were TNM 332 and SNM 432 modified as indicated above. The tests were run at 300 surface feet per minute and 0.010, 0.012 and 0.015 inch feed per revolution with a 7.82 inch bar overhang. A slug clearance of 0.004/0.006 inch best nullified chatter with a resulting surface finish ranging from no visible chatter to a fine well controlled chatter. Cutting noise was slight in all cuts.

In a third set of finish boring tests with 0.005 to 0.060 inch depth of cut again utilizing as a test material 4142 SMT 24/26 Rc and a TNM 322 insert modified as indicated above and further modified with a flatted corner the overhang was varied from 5 to 1 to 8 to 1. The tests were run at 250 surface feet per min. to 450 surface feet per min. at 0.002, 0.004 and 0.006 inch feed per revolution. Again, chatter free surface finishes were produced with a slug clearance of 0.002 to 0.003 inch.

In comparison, a solid boring bar identical to the bar above in all other respects was subjected to the same set of tests with chatter resulting in each test and severe chatter in most.

Additional tests were also conducted with boring bars constructed according to the present invention and with inserts having molded in chip breaker grooves as well as standard inserts without chip breaker grooves. In all cases chatter was reduced or eliminated and performance was improved over a solid bar tested in the same large overhang conditions.

Free cutting steels tend to produce smaller amplitudes of vibration and therefore require less reactive dampening force which may be accommodated by smaller slug clearance for heavy cuts than in the case of the test material referred to above.

I claim:

1. A machining vibration damping support, comprising;
 a shank member,
 a plurality of longitudinal bores in said shank member having cross sectional areas comprising a minor fraction of the cross sectional area of said shank member,
 the material of said shank member surrounding said bores providing an integral structurally rigid network,
 at least one mass member in each longitudinal bore having a circumference only slightly less than said bore and sized for axial as well as circumferential clearance therewithin,
 said mass members being freely movable within said clearance, and
 said longitudinal bores being substantially filled by said mass members with said axial clearance allowing substantially frictionless movement relative to any adjacent mass members and said shank member.

2. The support of claim 1 wherein the axes of said bores are parallel to the axis of said shank member.

3. The support of claim 2 wherein said bores are cylindrical.

4. The support of claim 3 wherein said mass members are cylindrical.

5. The support of claim 4 wherein all the mass members of at least one bore have equal diameters.

6. The support of claim 4 adapted for light or medium machining with circumferential clearance in the order of 0.002 to 0.003 inch diameter difference.

7. The support of claim 4 adapted for heavy machining with circumferential clearance in the order of 0.004 to 0.006 inch diameter difference.

8. The support of claim 1 wherein the density of said mass members is substantially greater than the density of said shank member.

9. The support of claim 8 including sintered tunsten carbide mass members.

10. The support of claim 1 wherein said clearance is occupied with a low viscosity to negligible fluid.

11. The support of claim 1 wherein at least the surfaces of said bores and said mass members are of wear resistant, substantially nondeformable material.

12. The support of claim 1 wherein said shank member has a cutting tool installed at one end wherein said bores and mass members are concentrated at the cutting end of said shank member.

13. The support of claim 12 wherein the remainder of said shank member is of solid construction.

14. The support of claim 1, including a separable extension member mounted on said shank member,
 interengaging pilot means at the interface of said shank and extension members,
 connecting bores in each of said extension and shank members,
 a connecting member extending through said connecting bores serving as an abutment for confining said mass members, and retention means engaging each of said extension and shank members, said retention means being adapted to draw said extension and shank members into rigid engagement.

15. The support of claim 14 wherein said retention means includes adjustable cam means.

16. The support of claim 15 wherein said adjustable cam means includes a conical depression and interengaging cone point screw.

17. A vibration damping extension member wherein the improvement comprises;
 a plurality of longitudinal bores in said extension member,
 at least one mass member in each longitudinal bore having a circumference only slightly less than said bore and sized for axial as well as circumferential clearance therewithin,
 said mass members freely moveable within said clearance, and
 said longitudinal bores being substantially filled by said mass members with said axial clearance allowing substantially frictionless movement relative to adjacent mass members and said extension member.

* * * * *

UNITED STATES PATENT AND TRADEMARK OFFICE
CERTIFICATE OF CORRECTION

PATENT NO. : 3,923,414
DATED : Dec. 2, 1975
INVENTOR(S) : DAVID ALAN HOPKINS

It is certified that error appears in the above–identified patent and that said Letters Patent are hereby corrected as shown below:

Col. 3, line 50, reads --the use of a softer steel with attendant lower natural--

Col. 4, line 39, reads --press fit plugs--

Col. 6, claim 9, reads --tungsten-- instead of "tunsten"

Signed and Sealed this twenty-second Day of June 1976

[SEAL]

Attest:

RUTH C. MASON
Attesting Officer

C. MARSHALL DANN
Commissioner of Patents and Trademarks